United States Patent [19]

Mouly

[11] 4,305,745
[45] Dec. 15, 1981

[54] METHOD OF ATTENUATING GLASS IN A FLOAT PROCESS

[75] Inventor: Raymond J. Mouly, Pittsburgh, Pa.

[73] Assignee: PPG Industries, Inc., Pittsburgh, Pa.

[21] Appl. No.: 137,329

[22] Filed: Apr. 4, 1980

[51] Int. Cl.³ .............................................. C03B 18/06
[52] U.S. Cl. .................................. 65/99 A; 65/182.3; 65/182.4
[58] Field of Search .................. 65/99 A, 182.3, 182.4

[56] References Cited

U.S. PATENT DOCUMENTS

| 3,771,985 | 11/1973 | Dickinson | 65/99 A |
| 3,843,346 | 10/1974 | Edge et al. | 65/99 A X |
| 3,929,444 | 12/1975 | May et al. | 65/182.4 |
| 4,055,407 | 10/1977 | Heithoff et al. | 65/99 A X |
| 4,074,994 | 2/1978 | Glikman et al. | 65/99 A X |

Primary Examiner—Arthur D. Kellogg
Attorney, Agent, or Firm—Dennis G. Millman

[57] ABSTRACT

Optical quality of float glass is improved by attenuating longitudinally prior to attenuating laterally; and by providing extended residence time prior to attenuating.

15 Claims, 7 Drawing Figures

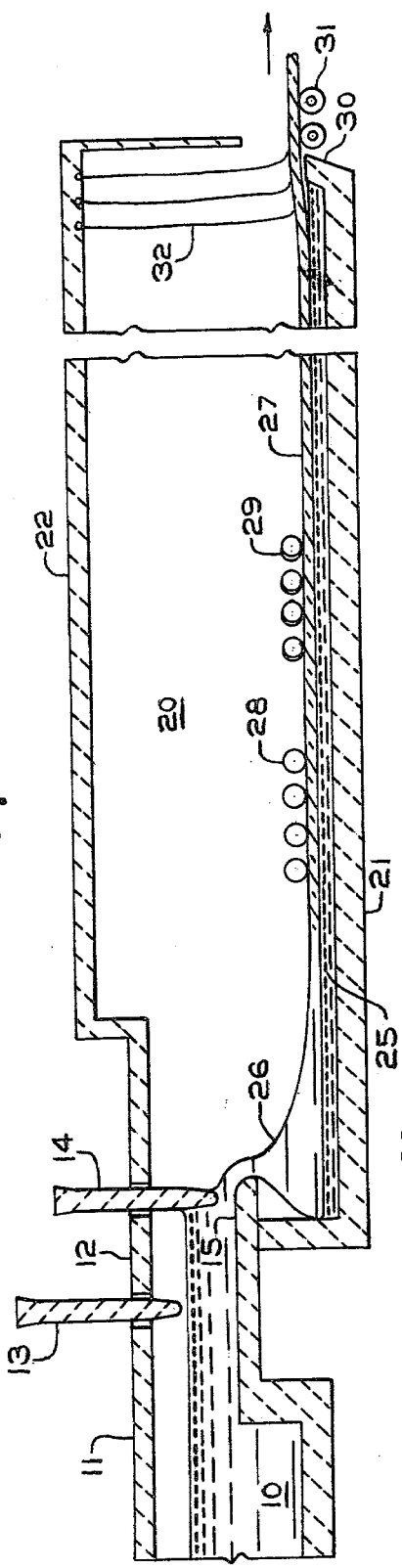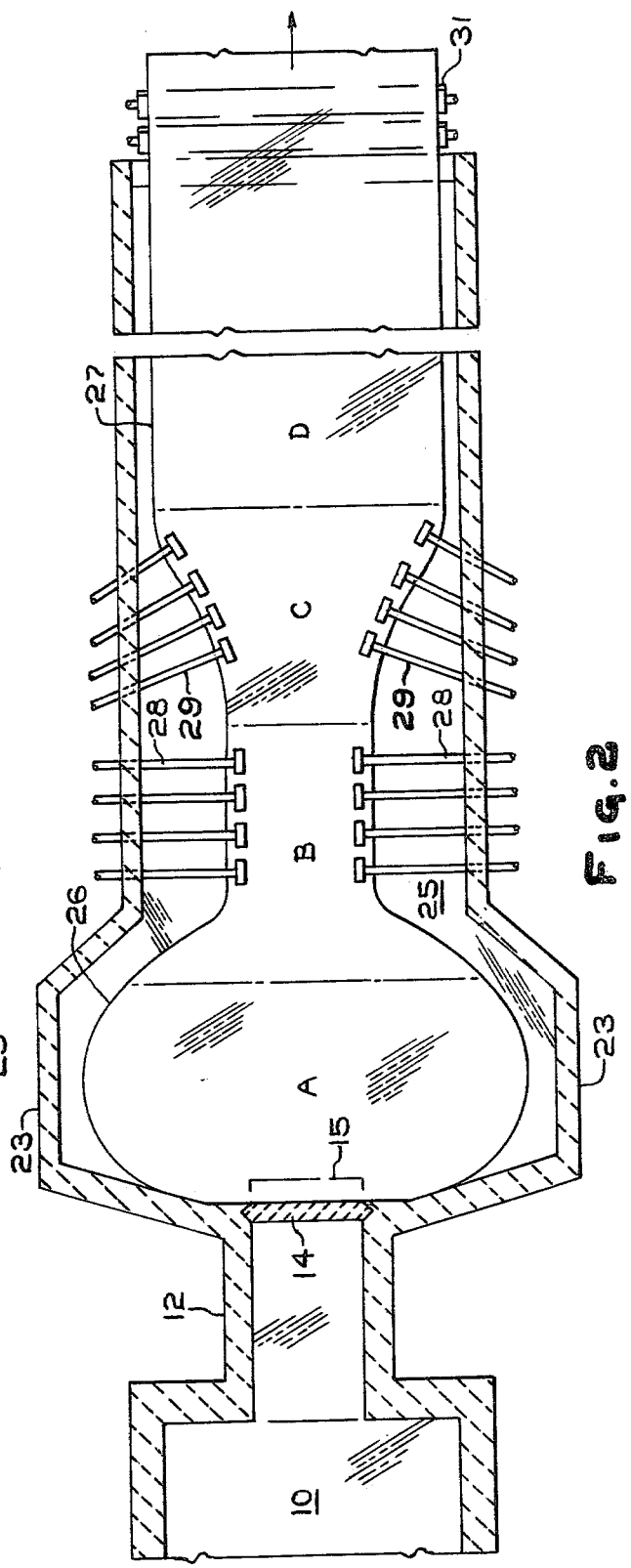

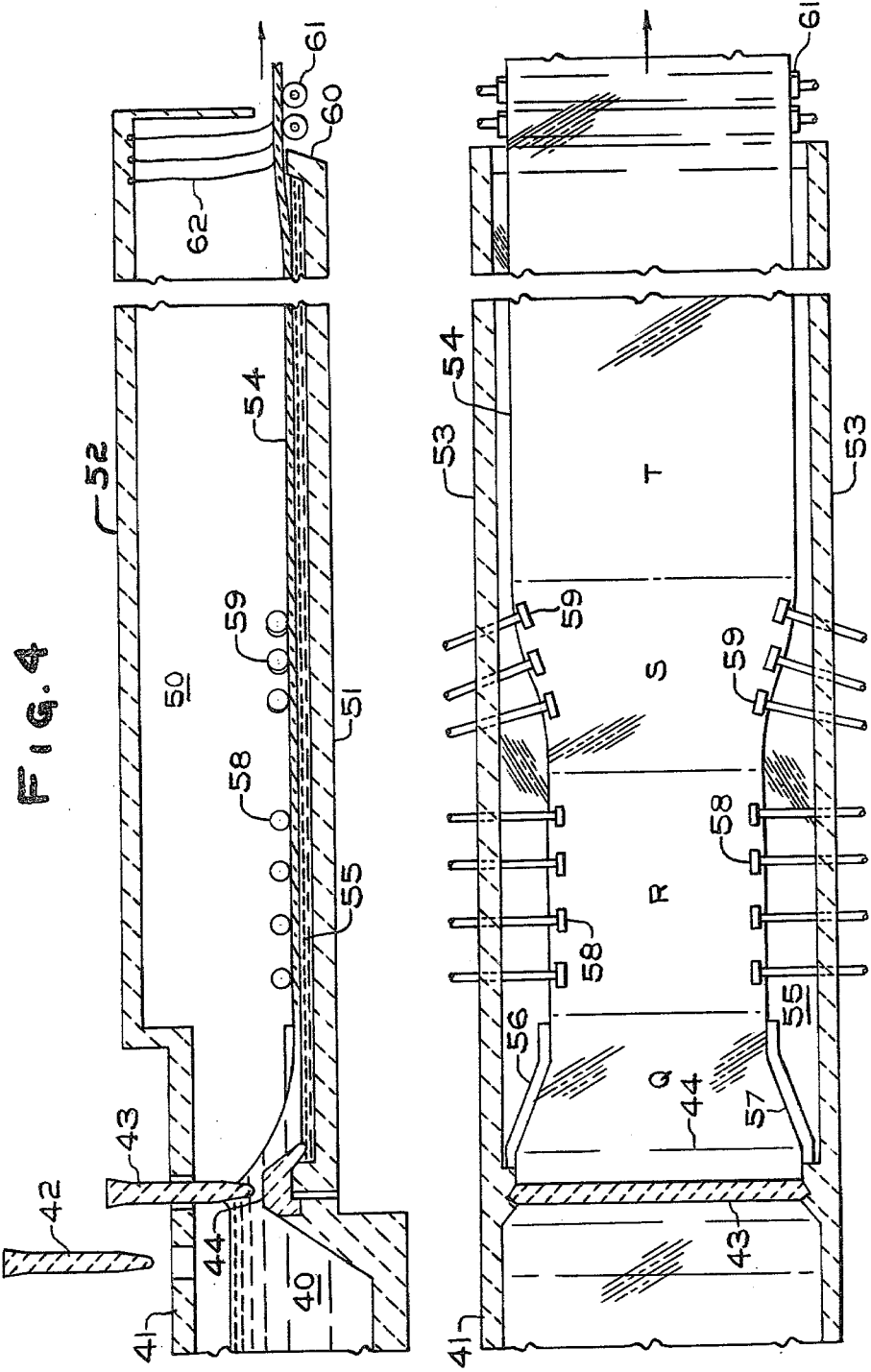

METHOD OF ATTENUATING GLASS IN A FLOAT PROCESS

BACKGROUND OF THE INVENTION

This invention relates to a method for manufacturing flat glass wherein the glass is formed into a flat sheet while supported on a surface of a pool of molten metal, commonly referred to as the float process. More particularly, this invention relates to a process for attenuating the glass while supported on the molten metal to a thickness below the equilibrium thickness of the glass in such a manner so as to minimize distortion in the product glass.

In a float forming process, molten glass is delivered into a pool of molten metal and thereafter formed into a continuous ribbon or sheet of glass as disclosed, for example, in U.S. Pat. No. 710,357 of Heal; U.S. Pat. No. 789,911 of Hitchcock; U.S. Pat. Nos. 3,083,551 and 3,220,816 of Pilkington; and U.S. Pat. No. 3,843,346 of Edge et al. Under the competing forces of gravity and surface tension, the molten glass on the molten metal spreads outwardly to an equilibrium thickness of about 0.27 inches. In order to produce glass of thicknesses less than the equilibrium thickness, the prior art has resorted to various arrangements for stretching the glass while still in a viscous state on the spool of molten metal. The simplest stretching technique is that shown in U.S. Pat. No. 3,215,516 of Pilkington wherein stretching is done in the longitudinal direction (the direction of glass travel) only, wherein the stretching force is provided by the tractive means withdrawing the glass from the float chamber. In such an arrangement, the ribbon loses width as it becomes thinner. A common refinement of this arrangement is to employ lateral stretching means in order to reduce the loss of ribbon width as it is being stretched longitudinally. Typical of this latter approach is the process shown in U.S. Pat. No. 3,695,859 to Dickinson et al. Another approach is to maintain the ribbon of glass at essentially constant width by applying lateral tractive forces to edge portions of the ribbon as the ribbon is being attenuated in the longitudinal direction as exemplified in U.S. Pat. No. 3,843,346 of Edge et al.

Process perturbations originating with the attenuating process affect the topography of the glass ribbon in ways that degrade the optical quality of the product glass. The topography of float glass is characterized by two types of elongated features, thickness variations and corrugations, which extend generally parallel to the direction of glass travel, i.e., the longitudinal direction. These deviations from perfect flatness are, in effect, cylindrical lenses which distort light reflected from and/or transmitted through the product glass sheet. Analysis of the distortion patterns using optical scanners in a direction transverse to the direction that the glass traveled in the forming process reveals that the distortion patterns can be considered as consisting of randomly superimposed sinusoidal waves whose wavelengths vary over a wide range. It has also been found that the dominant component of the instrumentally measured signal corresponding to transmitted light occurs at rather well defined wavelengths that may range from about 1.2 to 1.4 inches (3.0 to 3.6 centimeters) for a "constant width" float forming process as in the Edge et al. patent cited above, to about 0.25 to 1.0 inches (0.6 to 2.5 centimeters) in the free-fall type of float forming as in the Pilkington patents cited above. Furthermore, these dominant wavelengths have been found to lie within a range to which the human eye is particularly sensitive for most applications.

Surface distortion in float glass is believed to arise from several categories of perturbations. First, inhomogeneities in the glass composition ("ream") not only cause nonuniformity of the refractive index of the glass but also can contribute to surface distortion. Second, thermal nonuniformity either in the molten glass entering the float forming chamber or within the chamber itself can contribute to surface distortion. Third, variations in the flow of molten glass from the melter to the forming chamber, either volume flow rate fluctuations or inequalities in the thickness of entering molten glass across the width of the ribbon of glass. Fourth, mechanical perturbations from contact of various members of the forming apparatus with the deformable glass ribbon. These include, for example, the stretching machines and side barriers as well as fluctuations in the speed with which the dimensionally stable ribbon is withdrawn from the forming chamber. These perturbations in the glass/tin system generate thickness variations or corrugations in the glass through a variety of mechanisms such as differential stretching, viscous folding, wrinkling, embossing, and membrane stress. While minimizing the causes of these perturbations is desirable, such an approach is limited because the perturbations cannot be completely eliminated, particularly in the case where less than equilibrium thickness glass is being produced. Therefore, this invention relates to diminishing the effects on distortion of these perturbations rather than eliminating the perturbations themselves.

As a newly formed ribbon of glass still in a softened condition progresses along the molten tin bath its topography is continually changing as perturbations introduce new defects into the ribbon and previously introduced defects are changed in shape. A defect may decrease in amplitude by means of viscous decay, or the wavelength of a distortion pattern may be altered by extensive or compressive stresses. It would be desirable if these distortion decaying mechanisms could be coordinated with the attenuating process so as to minimize the amount of distortion imparted to the glass when attenuated to below equilibrium thicknesses.

Some attempts have been made in the prior art to correlate the manner of attenuation to minimizing surface defects such as in U.S. Pat. Nos. 3,440,030 (Thompson et al.); 3,533,772 (Itakura et al.); and 3,520,672 (Greenler et al.), but it is now believed that none of these approaches fully meets the problem.

SUMMARY OF THE INVENTION

It has now been found that applying attenuating forces to a ribbon of glass in a float chamber in a specific sequence can substantially reduce the amount of apparent optical distortion in below equilibrium thickness glass. In one embodiment of the invention, the sequence may be summarized as passing the glass first through a relaxation zone, then a longitudinal and lateral stretching zone before the glass has cooled sufficiently to become dimensionally stable. The relaxation zone lies closely downstream from the point at which molten glass is delivered into the molten metal bath and is characterized by a longitudinal component of glass velocity lower than that of the glass ribbon in subsequent sections of the float bath. This low longitudinal velocity may be provided by permitting the glass to spread laterally or by restricting the flow of the glass so as to provide the glass with extra depth. In either case, the object is to provide an extended residence time for each increment of molten glass in the relaxation zone so as to damp any flow variations in the stream of molten glass entering the float chamber.

Another embodiment of the invention is characterized by passing a glass ribbon through a longitudinal stretching zone and subsequently through a lateral stretching zone. In the longitudinal stretching zone the glass is attenuated in the longitudinal direction as it is mechanically restrained from shrinking substantially in width so that the attenuation occurs largely by virtue of thickness reduction. A substantial portion, e.g., about 50 percent, of the overall thickness reduction is effected in the longitudinal stretching zone. It is believed that most of the surface defects are imparted to the glass during this longitudinal stretching. Immediately following the longitudinal stretching zone is a lateral stretching zone in which mechanical forces are applied to the ribbon to increase its width while reducing the ribbon to its final thickness. Stretching in the lateral stretching zone is primarily in the lateral direction, but tractive force applied to convey the ribbon in the longitudinal direction is usually sufficient to at least prevent longitudinal shrinking. Following the lateral stretching zone is a quiescent zone in which the glass ribbon is permitted to cool to a condition at which it may be withdrawn from the float chamber without damaging its surfaces.

This particular sequence of attenuating a glass ribbon is designed to minimize the creation of observed surface distortion in the glass produced. The improvements of the present invention are based on the recognition that the optical power of glass surface distortion is a strong factor of the spatial frequency of the distortion features in accordance with the following relationship which relates optical power of a defect to its geometry:

$P = khf^2$ where P is optical power, k is a constant, h is the height or amplitude of the surface defect, and f is the spatial frequency of the distortion pattern. It can be seen from this relationship that while amplitude and frequency both affect the optical power, the frequency is a second power factor whereas the amplitude is merely a linear factor. Therefore, the primary objective of the present invention is to reduce the frequency of the distortion features. However, additional improvement due to amplitude reduction is also attained by the invention.

The invention is also based on the finding that longitudinal stretching is not only a major source of mechanical perturbations, but even more significantly, serves to increase the frequency of surface defects introduced into or pre-existing in the glass ribbon. Accordingly, the longitudinal stretching zone of the present invention preferably is preceded by the relaxation zone so as to minimize the effects of any perturbations on the glass entering the longitudinal stretch zone. Furthermore, by carrying out most of the longitudinal stretching, which is accompanied by some of the most harmful perturbations, at a point where the ribbon is relatively narrow in width permits subsequent operations to be performed on the ribbon which reduce the amplitude and frequency of the surface distortion produced by the longitudinal stretching. More specifically, by widening the ribbon in the subsequent lateral stretching zone, the distortion patterns produced by the longitudinal stretching also become stretched in the lateral direction, thereby reducing their frequencies as well as their amplitudes.

Yet another aspect of the invention relates particularly to the "constant width" delivery type of float process described in the aforementioned patent of Edge et al. In conjunction with such a process, the present invention contemplates narrowing the layer of glass shortly after its delivery onto a pool of molten metal and delivering the thus-narrowed ribbon to a longitudinal and lateral stretching process as described above. In this manner, the harmful longitudinal attenuation may be carried out on a relatively narrow ribbon so that lateral attenuation may be subsequently carried out to reduce the frequency of the distortion patterns.

A variety of commercial configurations for forming flat glass on baths of molten metal may be adapted to practice the present invention, and several embodiments of such adaptations will be described herein.

THE DRAWINGS

FIG. 1 is a schematic cross-sectional side view of a preferred embodiment of the present invention employed in conjunction with a freefall molten glass delivery system.

FIG. 2 is a schematic plan view of the glass forming chamber of FIG. 1.

FIG. 4 is a schematic cross-sectional side view of an alternate glass forming chamber embodiment of the non-freefall type incorporating the features of the present invention.

FIG. 5 is a schematic plan view of the glass forming chamber of FIG. 4.

DESCRIPTION OF THE PREFERRED EMBODIMENT

Figure 3:
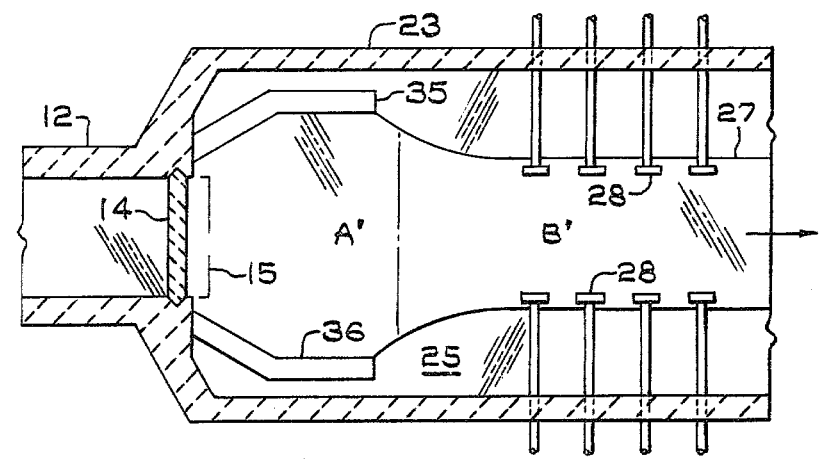
FIG. 3 is a schematic view of a modification of FIG. 2 embodiment wherein side restraints are employed at the delivery end of the forming chamber.

The embodiments depicted in FIGS. 1 and 2 relate to the type of float glass forming embodiments disclosed in U.S. Pat. Nos. 3,083,551 and 3,220,816 (Pilkington) which are in wide commercial use. Details of its construction and operation will be familiar to those of skill in the art. Generally, a mass of molten glass 10 from a melting furnace (not shown) is delivered by way of a canal 11 to a forming chamber 20. A cutoff tweel 13 and a metering tweel 14 extending through the roof 12 of the canal control the rate of delivery of the molten glass to the forming chamber. The chamber may comprise refractory floor 21, roof 22, and walls 23. A pool of molten metal 25 consists essentially of tin or an alloy thereof. The molten glass enters the forming chamber over a lip member 15 where it falls freely onto the molten metal to form a meniscus 26 which is permitted to spread laterally to the extent permitted by surface tension forces of the molten glass. The glass need not fall freely from the lip 15 but may be supported between the lip and the molten metal surface by a refractory member such as that shown in U.S. Pat. No. 4,055,407 (Heithoff et al.). This laterally spreading portion of the molten glass is designated zone A in FIG. 2 and constitutes the relaxation zone of the present invention. In zone A the glass is either at or above equilibrium thickness and is maintained at or above about 1700° F. (925° C.) up to a typical delivery temperature of about 2000° F. (1090° C.).

The principle function of zone A in the present invention is to maintain a relatively long residence time for the glass at this relatively high temperature range at which the glass will have a relatively low viscosity, which in turn encourages equilibration of flow perturbations arising from delivery of the molten glass onto the pool of molten metal. This relatively long residence time is achieved by providing a relatively large volume of molten glass in zone A, such as by permitting the glass to spread laterally as shown in FIG. 2. Alternatively, the increased volume may be attained by enhancing the depth of the glass in zone A by means of side barriers or other means to urge the glass inwardly. An example of such side barriers is shown in FIG. 3 where barriers 35 and 36 prevent the uncontrolled spreading of the glass in zone A'.

In FIG. 2, zone B represents a longitudinal stretching zone. The glass enters zone B at a temperature of about 1800° F. (980° C.) at approximately equilibrium thickness. The temperature of the glass ribbon is permitted to fall as it passes through zone B but the temperature is controlled so that the temperature is not below 1500° F. (815° C.) when it leaves the subsequent zone, zone C. Glass is drawn from zone A into zone B in the longitudinal direction whereby forces are applied to the glass which tend to cause the glass ribbon to be reduced in width and thickness. However, the reduction of width would be much more pronounced than the reduction in thickness if the longitudinal attenuation were permitted to proceed without restriction. This is disadvantageous since the ultimate object of attenuation is to reduce the glass thickness, and since a narrow glass ribbon is less useful commercially. Therefore, means are provided in zone B to restrict the narrowing of the ribbon and to force the attenuation in zone B to take place primarily at the expense of the thickness of the ribbon. The width-controlling means is preferably a set of rotating rolls 28 as shown in the drawings or any of the width controlling means known in the art such as gas jets, blades or electromagnetic means. Preferably, the rolls 28 may be of the particular design shown in U.S. Pat. No. 3,929,444 (May et al.). A plurality of sets of rolls are provided in zone B so as to maintain the width of the ribbon substantially constant, each set consisting of a pair of rolls on opposite sides of the ribbon. The rolls engage the top surface of the edges of the ribbon, and their speeds of rotation are controlled so as to accelerate the longitudinal velocity of the ribbon as it passes through zone B. Although not evident from FIG. 2, it is preferred that the rolls in zone B be angled outwardly slightly (about 5° to 10° from the direction of glass travel). In zone B the thickness of the glass is reduced from approximately the equilibrium thickness to a substantially reduced thickness typically on the order of about halfway or more toward the desired final thickness. This longitudinal attenuation is believed to induce a substantial amount of surface distortion in the glass.

Subsequently, the glass enters a lateral stretching zone, designated as zone C in FIG. 2, where the glass is brought to its final thickness. The glass in zone C may range in temperature from about 1800° F. (980° C.) to about 1500° F. (815° C.). In this final attenuation step the thickness reduction is achieved primarily by increasing the width of the ribbon. Lateral stretching forces are provided by means engaging the edges of the ribbon, such as sets of rolls 29 which may be the same design as rolls 28, or other known attenuating devices. The rolls 29 are angled so as to impart a lateral component of force to the glass ribbon. Longitudinal force is also applied to the glass in zone C by means of the rolls 29 as well as by the conveying means acting upon the formed ribbon beyond the exit of the forming chamber. The application of longitudinal force in zone C is desirable to assure that the final attenuation is accomplished through thickness reduction rather than by shortening of the longitudinal dimension. Some acceleration in the longitudinal direction may be imparted to the ribbon in zone C so as to stretch the ribbon in both the longitudinal and lateral directions, but the longitudinal stretching in zone C should be minor relative to that imparted to the glass in zone B.

The ratio of the final ribbon width to the ribbon width in zone B is directly proportional to the frequency reduction attained, and accordingly directly affects the reduction of the optical power of the distortion. Therefore, it is desirable to maximize lateral attenuation in zone C. It has been found that a dominant distortion pattern due to thickness variation having a frequency ranging from about 0.70 to about 0.80 cycles per inch (0.28 to 0.32 cycles per centimeter) is created by longitudinal attenuation as in zone B. This frequency of optical distortion unfortunately happens to be in a region of frequencies which are highly sensitive to the human eye. The lateral attenuation in zone C advantageously reduces this frequency in accordance with the following relationship:

$$f_2 = f_1 \times W_B/W_D$$

where $f_1$ is the optical distortion frequency entering zone C, $f_2$ is the optical distortion frequency of the final glass product, $W_B$ is the width of the glass ribbon in zone B, and $W_D$ is the width of the glass ribbon in zone D. Accordingly, it is desirable to increase the ribbon width in the lateral attenuation zone C to at least 1.05 times the width of the ribbon in zone B, preferably by a factor of 1.1, and most preferably by a factor of 1.5 or higher. When feasible, it is desirable for the final ribbon width to exceed the maximum width of the glass in the relaxation zone.

After lateral attenuation, the glass ribbon enters zone D in FIG. 2 where it is permitted to cool without further attenuation to a temperature, typically about 1100° F. (595° C.), at which it is dimensionally stable and sufficiently hardened to be lifted from the pool of molten metal by means of lift-out rolls 31 at the exit lip 30 of the float chamber. Curtains 32 conventionally isolate the atmosphere of the float chamber from the outside atmosphere. Subsequently, the glass ribbon is typically conveyed on a roller conveyor through an annealing lehr.

Figure 6:
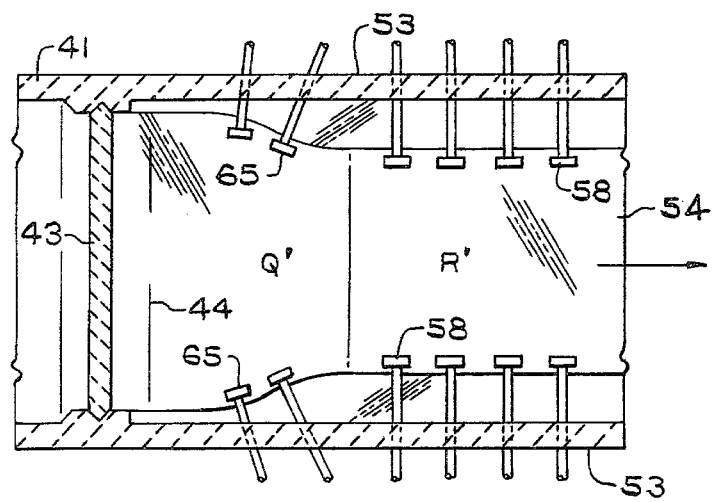
FIG. 6 is a schematic plan view of a delivery end modification of the FIG. 5 embodiment employing edge roll machines in the relaxation zone.
Figure 7:
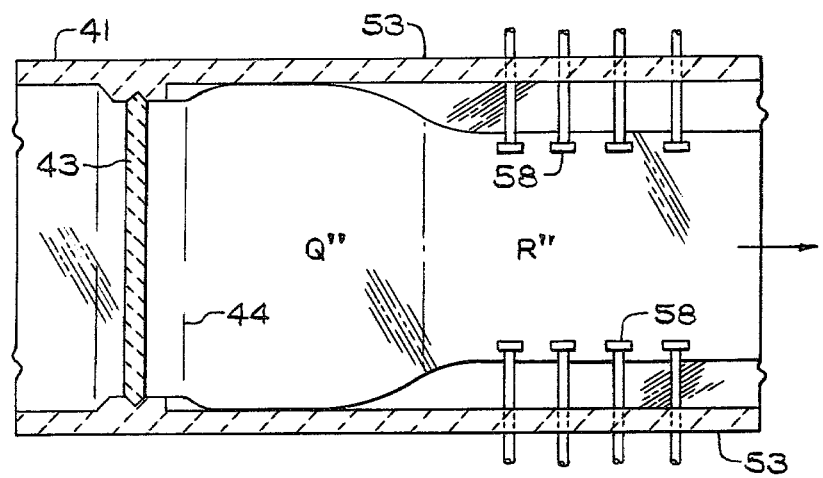
FIG. 7 is a schematic plan view of the delivery end of another variation of the embodiment of FIG. 5 wherein the ribbon width is permitted to expand in the relaxation zone.

FIGS. 4 and 5 depict an adaptation of the present invention to a "constant width" type forming process as disclosed in U.S. Pat. No. 3,843,346 (Edge et al.). This embodiment differs from the embodiment of FIGS. 1 and 2 in that molten glass is delivered onto the molten metal in the forming chamber by means of a wide threshold and without free fall or unhindered lateral spread. Molten glass 40 is contained in a melting furnace 41 provided with a cutoff tweel 42 and a metering tweel 43 at the junction between the melting furnace and the forming chamber 50. A wide threshold 44 underlies the metering tweel 43 and supports the glass during its delivery into the forming chamber until it is supported by the molten metal 55. The forming chamber 50 may consist of a bottom 51, roof 52, and sidewalls 53 of conventional construction in the art. In accordance with the present invention, the glass ribbon 54 passes in sequence through four zones designated Q, R, S, and T in FIG. 5 and which correspond in function to zones A, B, C, and D described above in connection with FIG. 2. Zone Q is the relaxation zone where, as previously described, the glass is maintained relatively undisturbed at a relatively high temperature in order to reduce the volumetric nonuniformities in the newly delivered layer of molten glass. Lengthening of the residence time in zone Q is accomplished by means of side barriers 56 and 57 which are angled towards the center of the ribbon in the downstream direction so as to impede the downstream flow of the molten glass, thereby increasing the depth of the glass in zone Q. Barriers 56 and 57 also advantageously narrow the width of the ribbon prior to its entry into longitudinal stretching zone R. Alternate arrangements for increasing the residence time of the glass in the relaxation zone are shown in FIGS. 6 and 7. In FIG. 6, inwardly angled rotating rolls 65 engage marginal edge portions of the ribbon so as to narrow and increase the thickness of the glass ribbon in zone Q'. In FIG. 7, the glass in relaxation zone Q" is permitted to spread close to or into contact with sidewalls 53 of the forming chamber, thereby increasing the total volume of glass within the relaxation zone. It may be preferred to avoid direct contact of the glass with the refractory walls 53 by means of graphite barriers or the like supported between the edges of the glass ribbon and the adjacent wall in the FIG. 7 embodiment.

Referring again to FIG. 5, the glass, after leaving relaxation Q, enters longitudinal stretching zone R wherein the ribbon is subjected to longitudinal attenuation to substantially reduce its thickness while maintaining substantially constant width by means of edge roll members 58 in the same manner described above in connection with zone B in FIG. 2. Likewise, subsequent lateral attenuation in a lateral stretching zones S, which includes outwardly angled edge roll means 59, is carried out in the same manner as in zone C described in connection with the FIG. 2 embodiment above. As in the previous embodiment, the temperature of the glass in zones R and S ranges from 1800° F. to 1500° F. (980° C. to 815° C.). Finally, the glass is permitted to cool, typically to a temperature of about 1100° F. (595° C.), in a cooling zone T after which the dimensionally stable ribbon of glass is lifted over exit lip 60 by means of liftout rolls 61. Curtains 62 isolate the float chamber atmosphere from the exterior atmosphere.

A variation of the invention entails passing the glass from a relaxation zone such as A, Q, Q', or Q" as in the previously described embodiments into a combined longitudinal and lateral attenuation zone. In such a zone, the lateral and longitudinal attenuation may be carried out substantially simultaneously so that the ribbon of glass is increased in width to essentially its final width and is decreased in thickness to essentially its final thickness during passage therethrough.

It should be apparent that additional variations are possible within the principles of the present invention. For example, side barriers as in FIG. 5 or inwardly angled edge roll devices as in FIG. 6 could be employed in combination with the narrow delivery system of FIG. 2 so as to provide a relatively narrow, thick relaxation zone. Other variations and modifications employing features known in the art will be apparent to those of skill in the art and are within the scope and spirit of the invention as defined by the following claims.

I claim:

1. A method of making a continuous sheet of glass of below equilibrium thickness comprising the steps of:

delivering a stream of molten glass at a first end of a longitudinally extending pool of molten metal onto a first zone of the molten metal pool at a rate such that the glass thickness in the first zone is maintained greater than equilibrium thickness;

drawing a ribbon of the glass in a horizontal longitudinal direction from the first zone onto a second zone of the molten metal pool and stretching the ribbon in the second zone in a longitudinal direction while being restrained against shrinkage in the transverse direction so that substantial reduction of the glass thickness to a thickness below equilibrium is effected in the second zone, and deviations from surface flatness of the ribbon are drawn into elongated distortions extending substantially longitudinally;

further drawing the ribbon of glass in the longitudinal direction from the second zone onto a third zone of the molten metal pool and stretching the ribbon in the third zone in the transverse direction so that additional reduction of glass thickness is effected, and the longitudinally extending surface distortions are stretched in the transverse direction, thereby reducing their spatial frequencies;

further drawing the ribbon of glass in the longitudinal direction from the third zone into a fourth zone and cooling the glass in the fourth zone sufficiently to be dimensionally stable; and withdrawing the dimensionally stable glass ribbon of less than equilibrium thickness from a second end of the pool of molten metal, whereby a ribbon of glass is produced in which light transmitted through the glass is affected by optical distortion of reduced optical power.

2. The method of claim 1 wherein the glass is maintained in the first zone for a sufficient residence time to substantially damp volumetric flow fluctuations accompanying delivery of the glass onto the molten metal.

3. The method of claim 1 or 2 wherein the temperature of the glass is maintained at 1700° F. (925° C.) to 2000° F. (1090° C.) in the first zone, and 1500° F. (815° C.) to 1800° F. (980° C.) in the second and third zones.

4. The method of claim 1 or 2 wherein the glass ribbon is additionally stretched in the longitudinal direction in the third zone.

5. The method of claim 1 or 2 wherein the glass ribbon is stretched laterally in the third zone to a width at least 1.05 times the width of the glass ribbon in the second zone.

6. The method of claims 1 or 2 wherein the glass ribbon is stretched laterally in the third zone to a width at least 1.1 times the width of the glass ribbon in the second zone.

7. The method of claim 6 wherein the glass ribbon is stretched laterally in the third zone to a width greater than the width of the glass in the first zone.

8. The method of claim 1 or 2 wherein lateral forces are applied to side edge portions of the glass in the first zone so as to reduce the width of the glass within the first zone.

9. The method of claim 8 wherein the lateral forces in the first zone are applied by rotating rolls contacting the glass.

10. The method of claim 8 wherein the lateral forces in the first zone are applied by barrier means engaging the side edges of the glass.

11. A method of making a continuous sheet of glass of below equilibrium thickness comprising the steps of:

delivering a fluid stream of molten glass at a first end of a longitudinally extending pool of molten metal onto an initial zone of the molten metal pool at a rate sufficient to maintain a mass of relatively fluid glass at a thickness greater than equilibrium thickness in the initial zone, and providing sufficient residence time in the initial zone to substantially damp volumetric glass flow fluctuations which may accompany delivery of the glass onto the molten metal;

drawing a ribbon of the glass in a horizontal longitudinal direction from the mass of glass in the initial zone onto an attenuation zone of the molten metal pool, and stretching the ribbon in the attenuation zone in the longitudinal direction and simultaneously or subsequently in the transverse direction to a sufficient extent to increase the width of the ribbon and to effect a substantial reduction of the glass thickness below equilibrium in the attenuation zone, so that as elongated surface distortions of the ribbon are induced by the longitudinal stretching, their spatial frequencies are reduced by the transverse stretching;

further drawing the ribbon of glass in the longitudinal direction from the attenuation zone into a cooling zone and there cooling the glass sufficiently to be dimensionally stable; and withdrawing the dimensionally stable glass ribbon of less than equilibrium thickness from a second end of the pool of molten metal, whereby a ribbon of glass is produced in which light transmitted through the glass is affected by optical distortion of reduced severity.

12. The method of claim 11 wherein the temperature of the glass is maintained at 1700° F. (925° C.) to 2000° F. (1090° C.) in the initial zone, and 1500° F. (815° C.) to 1800° F. (980° C.) in the attenuation zone.

13. A method of making a continuous sheet of glass of below equilibrium thickness comprising the steps of:

delivering a layer of molten glass of established width onto an elongated pool of molten metal, narrowing the width of the layer of glass to a reduced width below said established width in a first zone of the molten metal pool by means engaging side edge portions of the layer in the first zone so as to provide sufficient residence time for the glass in the first zone to substantially damp volumetric glass flow fluctuations which may accompany delivery of the glass onto the molten metal, horizontally drawing a ribbon of glass from said first zone into a second zone of the molten metal pool, and stretching the ribbon in the second zone to a thickness less than equilibrium thickness and to a width greater than said reduced width, whereby reduced optical distortion of transmitted light is present in the glass produced.

14. The method of claim 1 wherein attenuation of the glass to final thickness consists essentially of said stretching in the second and third zones.

15. The method of claim 11 wherein the last increment of longitudinal stretching is followed by transverse stretching.

* * * * *

UNITED STATES PATENT AND TRADEMARK OFFICE
CERTIFICATE OF CORRECTION

PATENT NO. : 4,305,745

DATED : December 15, 1981

INVENTOR(S) : Raymond J. Mouly

It is certified that error appears in the above-identified patent and that said Letters Patent are hereby corrected as shown below:

Under "References Cited" on the Title Page, insert the following:

| | | | |
|---|---|---|---|
| 710,357 | 9/02 | Heal | 65/258 |
| 789,911 | 5/05 | Hitchcock | 65/99 A |
| 3,083,551 | 4/63 | Pilkington | 65/32 |
| 3,215,516 | 11/65 | Pilkington | 65/94 |
| 3,220,816 | 11/65 | Pilkington | 65/99 A |
| 3,352,657 | 11/67 | Charnock | 65/91 X |
| 3,440,030 | 4/69 | Thompson et al. | 65/99 A |
| 3,520,672 | 7/70 | Greenler et al. | 65/91 |
| 3,533,772 | 10/70 | Itakura et al. | 65/182.4 |
| 3,533,773 | 10/70 | Fujimoto et al. | 65/182.4 |
| 3,695,859 | 10/72 | Dickinson et al. | 65/99 A |

Foreign Patent Documents -
635,217   11/63   South Africa - Plumat

Other References -
Journal of the American Ceramic Society, pgs. 1-5, Vol. 60, No. 1-2, Jan.-Feb., 1977 "A One Dimensional Model of Stretching Float Glass" by O.S. Narayanawamy.

Signed and Sealed this

Seventeenth Day of August 1982

[SEAL]

Attest:

Attesting Officer

GERALD J. MOSSINGHOFF
Commissioner of Patents and Trademarks